United States Patent [19]

Gifford et al.

[11] Patent Number: 4,463,071
[45] Date of Patent: Jul. 31, 1984

[54] SECONDARY BATTERIES USING ROOM-TEMPERATURE MOLTEN NON-AQUEOUS ELECTROLYTES CONTAINING 1,2,3-TRIALKYLIMIDAZOLIUM HALIDES OR 1,3-DIALKYLIMIDAZOLIUM HALIDE

[75] Inventors: Paul R. Gifford, Union; Lawrence W. Shacklette; James E. Toth, both of Maplewood; James F. Wolf, Mine Hill, all of N.J.

[73] Assignee: Allied Corporation, Morris Township, Morris County, N.J.

[21] Appl. No.: 556,496

[22] Filed: Nov. 30, 1983

[51] Int. Cl.$^3$ .............................................. H01M 6/14
[52] U.S. Cl. .................................. 429/194; 429/198; 429/199; 429/213
[58] Field of Search ................. 429/194, 198, 199, 213

[56] References Cited

U.S. PATENT DOCUMENTS

| | | | |
|---|---|---|---|
| 2,446,331 | 8/1948 | Hurley | 204/39 |
| 2,446,349 | 8/1948 | Wier et al. | 204/39 X |
| 2,446,350 | 8/1948 | Wier | 204/39 |
| 4,115,390 | 9/1978 | Nardi | 260/290 HL |
| 4,122,245 | 10/1978 | Nardi et al. | 429/194 |
| 4,321,114 | 3/1982 | MacDiarmid et al. | 429/213 X |
| 4,355,086 | 10/1982 | Saathoff et al. | 429/199 X |

FOREIGN PATENT DOCUMENTS 0036118 2/1981 European Pat. Off. .
0076119 9/1982 European Pat. Off. .

OTHER PUBLICATIONS

Inorg. Chem. 1982, 21, 1263–1264, Wilkes et al.
J. Electrochem. Soc. (1983), 130, (No. 9), pp. 1965–1969, Osteryoung et al.
J. S. Wilkes et al., in the Frank J. Seiler Research Laboratory Technical Report FJSRL-TR-81-0011, ADA 107,989, Oct. 1981.
J. P. Gabano (Academic Press, 1983) and in K. M. Abraham, Solid State Ionics, vol. 7, pp. 199–212, (1982).
"Lithium Batteries", J. P. Gabano, Ed., (Academic Press, 1983), p. 392.
M. Armand and P. Touzain in Mater. Sci. and Eng., vol. 31, pp. 319–329, (1977).

*Primary Examiner*—Charles F. LeFevour
*Attorney, Agent, or Firm*—Alan M. Doernberg; Gerhard H. Fuchs; Thomas D. Hoffman

[57] ABSTRACT

Batteries and especially secondary batteries employing selected anodes and cathodes such as conjugated backbone polymers and transition metal chalcogenides inserted with alkali metal cations (especially lithium) and molten, non-aqueous electrolyte compositions containing admixture of aluminum halide and at least one of 1,2,3-trialkylimidazolium halide and 1,3-dialkylimidazolium halide having the formulae TimX and DimX, respectively:

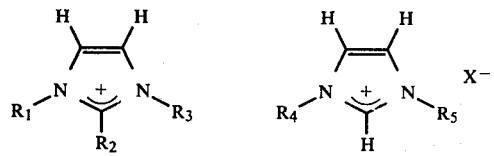

wherein $R_1$, $R_2$, $R_3$, $R_4$, and $R_5$ are independently alkyl groups of 1 to 12 carbons and X is independently halide, e.g., chloride and bromide and in some instances an alkali metal and/or tetraalkylammonium salt which may also be incorporated into the electrolyte composition are disclosed. The molar ratio of aluminum to trialkylimidazolium or to dialkylimidazolium in the electrolyte, may be varied over a wide range so as to make the molten electrolyte composition basic or neutral and as such the electrolyte is useful in batteries, especially secondary batteries comprising anodes of reduced conjugated backbone polymers or lithiated transition-metal chalcogenides such as $Li_xWO_2$ and a variety of cathodes such as oxidized conjugated backbone polymers or lithiated transition-metal chalcogenides such as $Li_xCoO_2$.

29 Claims, No Drawings

SECONDARY BATTERIES USING ROOM-TEMPERATURE MOLTEN NON-AQUEOUS ELECTROLYTES CONTAINING 1,2,3-TRIALKYLIMIDAZOLIUM HALIDES OR 1,3-DIALKYLIMIDAZOLIUM HALIDE

BACKGROUND OF THE INVENTION

This invention relates to batteries and especially secondary batteries employing selected anodes and cathodes such as conjugated backbone polymers and transition-metal chalcogenides inserted with alkali metal cations (especially lithium) and molten, non-aqueous electrolyte compositions containing admixtures of aluminum halide and at least one of 1,2,3-trialkylimidazolium halide 1,3-dialkylimidazolium halide.

The use of mixtures of 2 moles of anhydrous aluminium halide such as $AlCl_3$ and 1 mole of a N-alkylpyridinium bromide or chloride as liquid electrolyte for electrodeposition of aluminum on a metal cathode such as iron at about room temperature is disclosed in U.S. Pat. Nos. 2,446,349 and 2,446,350. Also see U.S. Pat. No. 2,446,331. U.S. Pat. No. 4,115,390 (J. Nardi) and U.S. Pat. No. 4,122,245 (J. Nardi, et al) describe the preparation of 1-alkylpyridinium chloride salts and the use of these salts for the preparation of 2:1 (mol/mol) $AlCl_3$:1-alkylpyridinium chloride room-temperature molten salt electrolytes. U.S. Pat. No. 4,122,245 discloses that the 1-alkylpyridinium molten salts are useful as low temperature battery electrolytes and describe a test cell employing aluminum or glassy carbon as the anode and chloranil as the cathode.

U.S. Pat. No. 4,355,086 (Saathoff et al.) discloses that the discharge rate and internal conductivity of a lithium thionyl chloride battery is improved by the addition of a mixture of aluminum chloride and n-butylpyridinium chloride to the cell electrolyte.

The preparation and use of 1,3-dialkylimidazolium chloride salts with aluminum chloride for room-temperature molten salt electrolytes in a battery cell having an aluminum anode and an iron(III)chloride cathode is described by J. S. Wilkes, et al., in the Frank J. Seiler Research Laboratory Technical Report FJSRL-TR-81-0011; ADA 107,989, October, 1981 and Inorg. Chem., 1982, 21, 1263–1264. Wilkes et al. assert that the 1,3-dialkylimidazolium chloroaluminate melts provide an increased liquidus composition range and improved stability to electrochemical reduction compared to the 1-alkylpyridinium chloride-based melts.

R. A. Osteryoung and co-workers at SUNY at Buffalo (J. Electrochem. Soc. (1983), 130 (No. 9) at pages 1965–1967 and 1968–1969) suggest that neutral room-temperature molten salts such as alkylpyridinium chloride or 1,3-dialkylimidazolium chloride-aluminum chloride might be useful for studies of polymer electrodes.

A variety of different batteries, and especially secondary non-aqueous batteries, have been described containing at least one electrode in which the active material is a conjugated polymer such as polyacetylene or polyphenylene. Exemplary disclosures of such batteries are U.S. Pat. No. 4,321,114 to MacDiarmid et al. (1981); European patent application No. 36,118 (corresponding to U.S. Ser. No. 220,496); European patent application Nos. 58,469 and 76,119, both of Showa Denko K.K.

There is an on-going search for batteries, especially secondary batteries employing useful working electrodes and a room-temperature, molten non-aqueous ionic liquid electrolyte having various physical and chemical properties superior to those of previously reported molten ionic liquid electrolytes, and especially having superior stability to electrochemical oxidation and reduction over a wider liquid composition range.

SUMMARY OF THE INVENTION

It has been discovered that batteries, and especially secondary batteries, containing an anode such as a reduced conjugated backbone polymer or a lithiated transition-metal chalcogenide and a variety of cathodes may be constructed when the electrolyte used is molten, non-aqueous admixtures of aluminum halide, $AlX_3$, e.g., $AlCl_3$ or $AlBr_3$ and a 1,2,3-trialkylimidazolium halide wherein the molar ratio, in the admixture of aluminum (Al) to 1,2,3, trialkylimidazolium (Tim) is no more than about 1:1. Depending on the particular cathode material used, the electrolyte composition may also contain an alkali metal cation (especially $Li^+$) and/or tetraalkylammonium salt, e.g., $Me_4N^+Cl^-$.

Accordingly, the present invention provides in one form a battery containing an anode, a cathode, and a molten, non-aqueous electrolyte wherein:

(a) the anode comprises conjugated backbone polymers or transition-metal chalcogenides into either of which alkali metal cations are inserted during charging;

(b) the cathode comprises a member selected from the group consisting of graphite, intercalation compounds of graphite, transition-metal chalcogenides and conjugated backbone polymers; and (c) the molten non-aqueous electrolyte comprises an admixture of aluminum halide having the formula $AlX_3$ and a 1,2,3-trialkylimidazolium halide having the formula TimX:

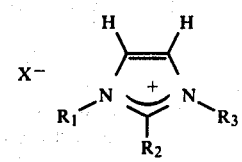

wherein the molar ratio of Al to Tim is no more than about 1:1 and wherein $R_1$, $R_2$ and $R_3$ are independently alkyl of 1 to 12 carbons and wherein X is independently halide or mixtures of halides and wherein the anodes and cathodes are chosen so that the voltage of the fully charged battery is greater than about 1.5 volts.

In a second form of the present invention, there is provided a battery containing an anode, a cathode, and a molten, non-aqueous electrolyte wherein:

(a) the anode comprises conjugated backbone polymers or transition-metal chalcogenides into either of which alkali metals are inserted during charging;

(b) the cathode comprises a member selected from the group consisting of graphite, intercalation compounds of graphite, transition-metal chalcogenides, and conjugated backbone polymers; and (c) a molten, non-aqueous electrolyte composition comprising an admixture of (i) aluminum halide, having the formula, $AlX_3$, and (ii) at least one of 1,2,3-trialkylimidazolium halide and 1,3-dialkylimidazolium halide having the formulae TimX and DimX, respectively:

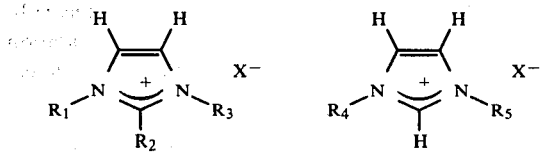

and (iii) an alkali metal or tetraalkylammonium salt; wherein $R_1$ to $R_5$ are independently alkyl of 1 to 12 carbons and wherein X is independently halide or mixtures of halides and wherein the molar ratio of aluminum to 1,2,3-trialkylimidazolium or 1,3-dialkylimidazolium is no more than about 1:1 and wherein the anodes and cathodes are chosen so that the voltage of the fully charged battery is greater than about 1.5 volts.

DETAILED DESCRIPTION OF THE INVENTION

Batteries and especially secondary batteries of the present invention employ selected anodes and cathodes such as conjugated backbone polymers and transition-metal chalcogenides inserted with alkali metal cations (especially lithium) and molten, non-aqueous electrolyte compositions containing admixtures of aluminum halide and at least one of 1,2,3-trialkylimidazolium halide and 1,3-dialkylimidazolium halide having the formulae, TimX and DimX, respectively:

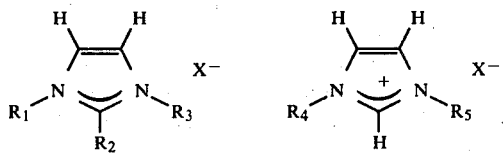

wherein $R_1$, $R_2$, $R_3$, $R_4$ and $R_5$ are independently alkyl groups of 1 to 12 carbons and X is independently halide, e.g., chloride or bromide or a mixture of halides. In some instances an alkali metal and/or tetraalkylammonium salt also is incorporated into the electrolyte composition. The molar ratio of aluminum hereinafter denoted by Al to trialkylimidalozium hereinafter denoted by Tim or to dialkylimidazolium hereinafter denoted by Dim, in the electrolyte, may be varied over a wide range so as to make the molten electrolyte composition basic or neutral and as such the electrolyte is useful in batteries, especially secondary batteries comprising anodes of reduced conjugated backbone polymers or lithiated transition-metal chalcogenides such as $Li_xWO_2$ and a variety of cathodes such as oxidized conjugated backbone polymers or lithiated transition-metal chalcogenides such as $Li_xCoO_2$.

The non-aqueous electrolyte compositions used in the present invention are prepared in accordance with the procedure of commonly-assigned U.S. patent application of Gifford and Palmisano Ser. No. 556,495 filed Nov. 30, 1983 which is hereby incorporated by reference by slow addition of no more than a stoichiometric amount of aluminum halide, e.g., $AlCl_3$ or $AlBr_3$ to known weight of 1,2,3-trialkylimidazolium halide having the formula TimX, wherein $R_1$, $R_2$, $R_3$, $R_4$ and $R_5$ are independently alkyl of 1 to 12 carbons and wherein X is halide such as fluoride, chloride, bromide or iodide, or mixtures thereof, but preferably chloride, iodide or bromide and more preferably chloride or bromide. The molar ratio of Al to Tim or Dim in the electrolyte composition may be varied over a wide range from greater than about 0.6:1 (basic) to no more than about 1:1 (neutral melt).

The 1,3-dialkylimidazolium halides and non-aqueous electrolyte compositions containing same may be prepared by a procedure exactly analogous to that described in reference to the 1,2,3-trialkylimidazolium electrolyte composition herein above.

While water may be present during the preparation of electrolyte compositions useful in the present invention, water deleteriously affects the use of the electrolyte compositions in batteries and as such must be removed prior to use.

In addition to the admixture of aluminum halide and trialkylimidazolium halide of formula TimX, and/or dialkylimidazolium halide of formula DimX, the electrolyte composition useful in the present invention may also contain an electrochemically-inert organic liquid and/or an alkali metal cation such as $Li^+$, $Na^+$, or $K^+$ and/or tetraalkylammonium salt such as $Me_4N^+$, $Et_4N^+$ or $n-Bu_4N^+$, hereinafter defined.

The organic liquids which may be included in the electrolyte compositions used in the batteries of the present invention should be electrochemically-inert to oxidation and reduction during use while simultaneously affecting a reduction in the viscosity and/or an improvement in the conductivity and stability of the electrolyte compositions used in the present invention. Examples of such organic liquids include propylene carbonate, sulfolane, 3-methyl-2-oxazolidone, alkane sultones, e.g., propane sultone, butane sultone [the use of sultones in electrolyte compositions is the subject of a related, commonly-assigned U.S. patent application of M. Maxfield et al. Ser. No. 556,717 filed Nov. 30, 1983 and the use of sultones for coatings on polymer anodes is the subject of a related, commonly-assigned U.S. patent application of M. Maxfield et al. Ser. No. 556,739 filed Nov. 30, 1983, both of said U.S. patent applications being filed on an even date herewith, dimethyl sulfoxide (DMSO), dimethyl sulfite, tetrahydrofuran (THF), 2-methyltetrahydrofuran (2-MeTHF), dioxane or 1,2-dimethoxyethane, dimethoxymethane, glymes, alkanoyl nitriles, e.g., proprionitrile, butyronitrile, acetonitrile, aranoylltnitriles, e.g. benzonitrile, dichloromethane, tetraethylsulfamide, aromatic hydrocarbons, e.g., toluene or benzene.

Mixtures of such available organic liquids may also be used such as sulfolane and acetonitrile. The organic liquid(s) chosen will, of course, depend upon many factors such as the precise electrolyte composition used, the voltage range desired as well as the choice of cathodes and anodes, as well as other components of the battery used.

While the major components of such batteries include electrodes, the electrolyte composition comprising admixtures of aluminum halide and 1,2,3,-trialkylimidazolium halide or 1,3-dialkylimidazolium halide wherein the molar ratio of Al to Tim or Dim is no more than about 1:1 (additionally containing a suitable electrochemically-inert organic liquid and/or an alkali metal and/or tetra alkylammonium salt) and conventional or unconventional housing, charging mechanism so as to allow the battery to operate as a secondary battery, current collector, porous divider or solid ion-conducting divider (which may conveniently divide the molten electrolyte into an anodic portion adjacent to the anode and a cathodic portion adjacent to the cathode) and the like, only the electrodes and electrolyte composition will be described.

The anodes and cathodes useful in the present invention are selected so that the voltage of the fully charged battery is greater than about 1.5 volts. As used herein, "anodes" shall mean the negative electrode and "cathodes" shall mean the positive electrode.

Suitable anodes include conjugated backbone polymers which are capable of being reduced (donor-doped). In their most heavily reduced state such polymer anode materials range in voltage from about 0.1 V to 1.5 V vs a lithium reference (Li/Li+) for measurements made in an organic electrolyte, for instance, comprised of a lithium salt dissolved in an ether. In ascending order of approximate voltage vs Li/Li+, examples of such polymers useful as anode materials include reduced polyacetylene (PA), poly(p-phenylene) (PPP), polynaphthalenediyl (PN), polyacenes, poly(phenylene vinylene) (PPV), polyazulene (PAZ), polythiophene (PT) and polyphenylquinoline (PPQ).

Conjugated backbone polymers suitable as operating either as anodes (when reduced) or as cathodes (when oxidized) include appropriate combinations of PA, PPV, PPP, PN, PT, PAZ, and substituted versions thereof such as poly(3-methylthiophene). Polyacetylene, PA and poly(p-phenylene), PPP are especially useful as both anodes and cathodes. It is to be understood that the conjugated backbone polymers generally useful as anodes are donor-doped (reduced) and that the conjugated backbone polymers useful as cathodes are acceptor-doped (oxidized).

Suitable anodes also include transition-metal chalcogenides inserted with alkali metal cations (especially lithium). Such anodes which operate in a voltage range from about 0.5 V to about 1.6 V vs Li/Li+ include $Li_xWO_2$ and $Li_xMoO_2$ wherein $0<x\leq 1$ and $Li_yTiS_2$, $Ti_yVS_2$, $Li_yVSe_2$ wherein $1<y<2$. Also considered useful as potential but less preferred anodes are lithium-alloys.

The suitable cathodes comprise a member selected from the group consisting of graphite, intercalation compounds of graphite, transition-metal chalcogenides, and conjugated backbone polymers which are capable of being oxidized (acceptor-doped).

Suitable intercalation compounds of graphite are described by M. Armand and P. Touzain in *Mater. Sci. and Eng.*, Vol. 31, pages 319–329 (1977) which is hereby incorporated by reference. Such intercalate compounds include transition-metal chlorides, bromides, and fluorides which are, e.g., $AlBr_3$, $BF_3$, $TiF_4$, $CoCl_2$, $FeCl_3$, $FeBr_3$, $HgCl_2$, $SbCl_5$, $MoCl_5$, $AlCl_3$, $WCl_6$, $NiCl_2$, $CrCl_3$.

The transition-metal chalcogenides, suitable as cathode materials useful in this invention, can contain inserted alkali metals and include the transition-metal dichalcogenides such as $TiS_2$ and, among others, those listed on page 392 of "Lithium Batteries" edited by J. P. Gabano (Academic Press, 1983) and in K. M. Abraham, *Solid State Ionics*, vol. 7 pp. 199–212 (1982) (both incorporated herein by reference). These include (with approximate open circuit potentials measured in various organic electrolytes when fully charged or devoid of inserted cations):

| | |
|---|---|
| $Na_xTiS_2$ | 2.1V versus Na/Na+ |
| $Na_xNbS_2Cl_2$ | 2.2V versus Na/Na+ |
| $Li_xFe_{0.25}V_{0.075}S_2$ | 2.4V versus Li/Li+ |

-continued

| | |
|---|---|
| $Li_xTiS_2$ | 2.5V versus Li/Li+ |
| $Li_xMoS_3$(amorphous) | 2.5V versus Li/Li+ |
| $Na_xCr_{0.5}V_{0.5}S_2$ | |
| $Na_xWO_{3-y}$ | 2.6V versus Na/Na+ |
| $Na_xMoS_3$(amorphous) | 2.7V versus Na/Na+ |
| $Na_xTaS_2$ | 2.7V versus Na/Na+ |
| $K_xWO_{3-y}$ | |
| $Li_xMoO_3$ | 2.8V versus Li/Li+ |
| $Li_xV_6O_{13}$ | 2.9 versus Li/Li+ |
| $Li_xCr_{0.5}V_{0.5}S_2$ | 2.9V versus Li/Li+ |
| $Li_xW_{0.2}V_{2.8}O_7$ | 3.0V versus Li/Li+ |
| $Na_xCoO_2$ | 3.3V versus Na/Na+ |
| $Li_xCr_3O_8$ | 3.6V versus Li/Li+ |
| $Li_xCoO_2$ | 4.7V versus Li/Li+ |

Alkali metal salts (especially Li+, but also Na+ K+) and/or tetraalkylammonium salts, (e.g. Me4N+, Et4N+ or n-Bu4N+) can be incorporated into the molten electrolyte to be used with the exemplary transition-metal chalcogenides on the above list. The salt may contain any anion which is stable to oxidation by the cathode material chosen for use in the batteries of the present invention. The choice of anion will affect the amount of salt which can be incorporated into the molten electrolyte or melt. Especially preferred anions are those which allow the largest amount of salts to be incorporated without adversely affecting the viscosity or the melting point of the melt. These preferred anions include halide, X, e.g., chloride, bromide or iodide or $AlX_4^-$, e.g., $AlCl_4^-$, $AlBr_4^-$ or $AlCl_3Br^-$, or $SbX_4^-$, e.g., $SbCl_4^-$. Other anions which may be used include, for example, $ClO_4^-$, $BF_4^-$, $PF_6^-$, $PCl_6^-$, $FeCl_4^-$, $PCl_4^-$, $AsF_6^-$, $SbF_6^-$, $SbCl_6^-$, $BCl_4^-$, $MoCl_6^-$, or $AsCl_6^-$ and corresponding bromides or mixtures of halides e.g., $FeCl_3Br^-$. It should be understood that the addition of a particular Lewis Acid salt may be accomplished either by the addition of said Lewis Acid salt itself (e.g., $Li^+AlBr_4^-$, $Li^+FeCl_4^-$ or $Li^+SbCl_6^-$) or by addition of the corresponding alkali metal or tetraalkylammonium halide (a Lewis Base in these metals) plus a Lewis Acid, i.e., e.g. $LiBr+AlBr_3$; $LiCl+FeCl_3$ or $LiCl+SbCl_3$). The proportions of added Lewis Base and Lewis Acid need not always be equal, and in some instances only a Lewis Base (e.g., LiCl or Me4N+Cl−) or Lewis Acid (e.g. SbCl5) may be added. Lithium salts which are preferred include LiCl, LiBr, LiI, Li+AlCl4−, Li+AlBr4−, or mixtures formed by addition of LiCl or LiBr or LiI to for example $AlCl_3$ or $AlBr_3$.

The preferred concentration of said salt in the electrolyte will depend upon the temperature of operation and other factors. Preferably, however, the salt is at a concentration where the conductivity of the electrolyte is near a maximum and below a concentration where the molten electrolyte may solidify as a result of any environmental conditions to which the battery may be exposed.

In the second form of the present invention wherein the molten electrolyte requires the presence of an alkali metal (especially Li+) or tetraalkylammonium (e.g. n-Bu4N+) salt, or mixtures thereof, the anion should be selected in accordance with the description recited in reference to its use with transition-metal chalcogenides hereinabove. It is to be understood, however, that certain anions, e.g., AsF6− should not be used with certain low voltage anodes, e.g., highly reduced polyacetylene and that certain other anions, e.g., I− should not be used with especially high voltage cathodes, e.g., oxidized poly(p-phenylene).

The conjugated backbone polymers suitable as cathodes in the present invention are those polymers which are capable of being oxidized (acceptor-doped). In their most heavily oxidized state such polymer cathode materials range in voltage from about 3.0 V to about 4.6 V vs Li/Li+ (for measurements made in various typical organic electrolytes). In ascending order of approximate voltage vs Li/Li+, examples of such polymers useful as cathode materials include oxidized polypyrrole (PP), polyacetylene (PA), polyaniline, polyazulene (PAZ), polythiophene (PT), poly(phenylene vinylene) (PPV), polyacenediyls (e.g. polynaphthalenediyl (PN), polyacenes, poly(p-phenylene) (PPP), polythianthrene (PTA), poly(phenothiazene) (PPT), poly(phenylene sulfide) (PPS), and poly(phenylene oxide) (PPO). Also included are substituted versions of the above, e.g., poly(3-methylthiophene) or copolymers of the above, other polymers having conjugation along at least one backbone thereof and rendered conductive by electrochemical doping with either cations, anions, or both. The preferred polymers useful as cathode materials are polyacetylene, and poly(p-phenylene).

The conjugated backbone polymers useful as anodes and/or cathodes may be in the form of a powder or a free-standing film. The electrode may also contain additives to act as binders such as polypropylene, polytetrafluoroethylene (sold by DuPont as TEFLON®) or poly(ethylene-chlorotrifluoroethylene (sold by Allied as HALAR®) or to raise the conductivity such as carbon black (sold by Shawinigan Products as Shawinigan Black®). The configuration of the polymer electrode may be of any desired type, including spirally wound, prismatic or bipolar prismatic.

When either graphite or a conjugated backbone polymer is chosen as the cathode material, anions present in the molten electrolyte compositions used in the present invention will be inserted into the cathode material during the charging of the battery. In embodiments described herein wherein an added salt is not present, the anions inserted will likely be of the form $AlX_4^-$ wherein X is independently halide or mixtures of halides, preferably chloride or bromide. Additional salts, alkali-metal (e.g., Li+, Na+, and K+) or tetraalkylammonium, e.g., $Me_4N^+$, $Et_4N^+$, $n-Bu_4N^+$ may also be incorporated into the molten electrolyte composition when a conjugated backbone polymer or graphite is used as the electroactive cathode material; the anion of such salts is typically halide, e.g., Cl−, Br− or I− or $AlX_4^-$, e.g., $AlCl_4^-$, $AlBr_4^-$ or $AlCl_3Br^-$ but may also be, for example, $ClO_4^-$, $AsF_6^-$, $PCl_6^-$, $BF_4^-$, $PF_6^-$, $SbF_6^-$, $SbCl_6^-$, $BCl_4^-$, $PCl_4^-$, $SbCl_4^-$, $MoCl_6^-$, $FeCl_4^-$, $AsCl_6^-$ and the corresponding bromides or mixtures of halides, e.g. $FeCl_3Br^-$.

The following examples illustrate the invention further, however, the specific recitation of details should not be interpreted as a limitation except as recited in the appended claims.

EXAMPLE 1

A neutral melt was prepared from 1,2-dimethyl-3-ethylimidazolium chloride (TimCl), aluminum chloride ($AlCl_3$) and lithium chloride (LiCl) wherein the molar ratio of components was approximately, Tim:Li:Al=3:1:4. A battery which was sealed in a glass cell employed a non-woven glass separator and was constructed in an inert atmosphere dry box with a polyacetylene cathode and anode. This battery was cycled but showed poor efficiency for the anode (the reduced, n-type doped, polymer). Since water was the assumed cause of this inefficiency the melt was dried by being stirred with a Li/Hg amalgam. Considerable reaction occurred producing black solids. Upon standing, the solids settled to the bottom of the vessel. The liquid at the top was removed and used as an electrolyte in a cell comprised of a polyacetylene (PA) film cathode, a PA anode (density 0.4 g/cm³, weight=7.5 mg for each electrode) and a nonwoven glass separator. Contact was made to anode and cathode with expanded nickel grids and the assembly was sealed in a glass vessel. The battery was charged by increasing the voltage in 0.05 V steps. During charging the anode (negative electrode) became reduced (presumably being inserted by Li+ or Im+ cations) and the cathode (positive electrode) became oxidized (presumably being inserted by $AlCl_4^-$ anions). The battery was cycled four times between the voltage limits of 1.15 to 0.2 V. Coulombic efficiency increased with each cycle equaling 79% on the third cycle where the charge supplied on discharge was equivalent to oxidation and reduction levels of 5.5% for cathode and anode respectively. On the fourth cycle after allowing a longer charging period, the charge obtained on discharge was equivalent to a 7.06% oxidation and reduction level of the polyacetylene (0.15 Ah/g of PA in each electrode).

EXAMPLE 2

A battery was constructed which was comprised of an anode of polyacetylene film (7 mg) contacted by expanded nickel grid and a cathode of lithium cobalt dioxide, $LiCoO_2$, contacted by a platinum grid. In detail, the cathode was composed by weight of 10% $Li_2O$ (present as an impurity), 20% poly(tetrafluoroethylene) (a binder), 10% Shawinigan Black® (a product of Shawnigan Products, a conductivity aid), and 70% $LiCoO_2$. The cathode mixture was pressed onto the platinum grid and cured at 300° C. The battery was equipped and assembled in a dry box with the electrolyte as described in Example 1. The battery was initially charged with a constant current of 0.3 mA/cm². On the second cycle the cell was charged at 5 mA/cm² and discharged at 1 mA/cm². On the third and fourth cycles charging and discharging were both accomplished at 1 mA/cm². The coulombic efficiency increased with each cycle even though the amount of charge stored was being increased as well. On the fourth cycle coulombic efficiency was 84% and the amount of charge removed on discharge was equivalent to a reduction level of the polyacetylene anode of 10.6% (0.22 Ah/g of PA). At a discharge rate of 1 mA/cm² the cell voltage varied in a range from 2.0 V to 1.5 V for the first 70% of the discharge capacity. Over this same range, the open-circuit voltage obtained by periodically interrupting the current for 30-sec. intervals varied from 2.1 V to 1.8 V.

EXAMPLE 3

Preparation of 1-methyl-3-ethylimidazolium chloride

All apparatus was flame-dried under vacuum prior to use. Chloroethane (Eastman Kodak Co.) was dried by storage over calcium hydride (Aldrich Chemical Co.). The 1-methylimidazole (Aldrich Chemical Co.) was dried by storage over solid KOH and subsequently vacuum distilled. Fifteen grams of distilled 1-methylimidazole was transferred into a 250 ml Fisher-Porter pressure vessel under dry argon in a glove box (Vacuum Atmospheres Co.). A four-fold mole excess (40 ml) of chloroethane was vacuum distilled into the reactor. The reaction mixture was stirred and heated at 60° C. As the reaction proceeded, a liquid product layer was observed to separate from the solution. The reaction was stopped after five days. Upon cooling, the product layer solidified. The excess chloroethane was removed by vacuum distillation. The product 1-methyl-3-ethylimidazolium chloride (24.8 g, 92% yield) was recrystallized by dissolving the solid in dry acetonitrile (25 mL) and pouring the resulting solution into cold, dry ethyl acetate (250 mL). This solution was vacuum filtered and dried. A basic or neutral melt may be prepared from this dialkylimidazolium chloride for use in secondaries batteries of the invention such as illustrated in Example 1.

We claim:

1. A battery containing an anode, a cathode, and a molten, non-aqueous electrolyte wherein:
   (a) the anode comprises conjugated backbone polymers or transition-metal chalcogenides into either of which are inserted alkali metal cations during charging;
   (b) the cathode comprises a member selected from the group consisting of graphite, intercalation compounds of graphite, transition-metal chalcogenides, and conjugated backbone polymers; and
   (c) the molten non-aqueous electrolyte comprises an admixture of aluminum halide, $AlX_3$ and 1,2,3-trialkylimidazolium halide having the formula TimX:

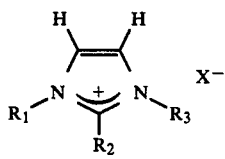

wherein the molar ratio of Al to Tim is no more than about 1:1 and wherein $R_1$, $R_2$ and $R_3$ are independently alkyl of 1 to 12 carbons and wherein X is independently halide or mixtures of halides and wherein the anode and cathode are chosen such that the voltage of a fully charged battery is at least about 1.5 volts.

2. The battery of claim 1 wherein both said anode and said cathode comprise conjugated backbone polymers.

3. The battery of claim 2 wherein said anode and said cathode are independently polyacetylene, poly(p-phenylene), poly(phenylene vinylene), polynaphthalenediyl, polyazulene, polythiophene, or substituted versions thereof.

4. The battery of claim 1 wherein said electrolyte further comprises an amount of an alkali metal and/or tetraalkylammonium salt effective to be inserted into at least one of said anode or said cathode.

5. The battery of claim 1 wherein both said anode and said cathode are polyacetylene.

6. The battery of claim 1 wherein both said anode and said cathode are poly(p-phenylene).

7. The battery of claim 1 wherein said anode is polyacetylene and said cathode is poly(p-phenylene).

8. The battery of claim 7 wherein said electrolyte still further comprises a salt containing $Cl^-$, $Br^-$, $I^-$, $AlX_4^-$, $ClO_4^-$, $FeX_4^-$, $BX_4^-$, $PX_4^-$, $PX_6^-$, $AsX_6^-$, $SbX_4^-$, $SbX_6^-$ or mixtures thereof and wherein X is independently chloride, bromide or fluoride.

9. The battery of claim 1 wherein said anode and said cathode comprise transition-metal chalcogenides.

10. The battery of claim 1 wherein said cathode comprises transition metal chalcogenides inserted with alkali-metal cations during discharging and wherein said anode comprises conjugated backbone polymers inserted with alkali-metal cations during charging.

11. The battery of claim 1 wherein said anode comprises a transition-metal chalcogenide inserted with alkali metal cations during charging and said cathode comprises a conjugated backbone polymer inserted with anions during charging.

12. The battery of claim 11 wherein said electrolyte further comprises an alkali metal and/or tetralkylammonium salt in amount sufficient to be inserted into said anode and said cathode.

13. The battery of claim 1 which further comprises means for applying an electrical charge whereby the battery can operate as a secondary battery.

14. The battery of claim 13 wherein $R_3$ is ethyl.

15. The battery of claim 13 wherein $R_3$ is n-butyl.

16. The battery of claim 1 wherein in formula TimX, $R_1$, $R_2$ and $R_3$ are independently linear alkyl groups of 1 to 5 carbons.

17. The battery of claim 1 wherein, in formula TimX, $R_1$ and $R_2$ are methyl and $R_3$ is ethyl or n-propyl or n-butyl.

18. A battery containing an anode, a cathode, and a molten, non-aqueous electrolyte wherein:
   (a) the anode comprises conjugated backbone polymers or transition-metal chalcogenides into either of which are inserted alkali metal cations during charging;
   (b) the cathode comprises a member selected from the group consisting of graphite, intercalation compounds of graphite, transition-metal chalcogenides and conjugated backbone polymers; and
   (c) the molten, non-aqueous electrolyte comprises an admixture of aluminum halide, $AlX_3$, and (ii) at least one of 1,2,3-trialkylimidazolium halide and 1,3-dialkylimidazolium halide having the formulae TimX and DimX respectively:

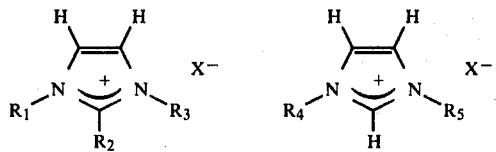

and (iii) an alkali-metal or tetraalkylammonium salt; wherein $R_1$ to $R_5$ are independently alkyl of 1 to 12 carbons and wherein X is independently halide or mixtures of halides and wherein the molar ratio of aluminum to 1,2,3-trialkylimidazolium or 1,3-dialkylimidazolium is no more than about 1:1 and wherein the anodes and cathodes are chosen so that the voltage of a fully charged battery is at least about 1.5 volts.

19. The battery of claim 18 wherein said cathode comprises a conjugated backbone polymer selected from the group consisting of oxidized polypyrrole, polyacetylene, poly(3-methylthiophene), polythiophene, poly(phenylene vinylene) polynaphthalenediyl, polythianthrene or poly(P-Phenylene) substituted versions thereof.

20. The battery of claim 19 wherein said conjugated backbone polymer is polyacetylene.

21. The battery of claim 19 wherein said conjugated backbone polymer is poly(p-phenylene).

22. The battery of claim 18 wherein the transition metal chalcogenide comprising the cathode is $Li_xCoO_2$ wherein $0 < x \leq 1$ and wherein said salt comprising said molten electrolyte is LiCl or LiBr.

23. The battery of claim 18 wherein said electrolyte comprises 1,3-dialkylimidazolium halide.

24. The battery of claim 23 wherein the $R_4$ and $R_5$ are linear alkyl of 1 to 5 carbons.

25. The battery of claim 18 wherein X is bromide or chloride.

26. The battery of claim 18 wherein said salt is a lithium halide.

27. The battery of claim 18 wherein said anode and said cathode comprise transition-metal chalcogenides.

28. The battery of claim 18 wherein said cathode comprises transition-metal chalcogenides inserted with alkali metal cations during discharging and said anode comprises conjugated backbone polymers inserted with alkali-metal cations during charging.

29. The battery of claim 18 wherein said anode comprises a transition-metal chalcogenide inserted with alkali metal cations during charging and said cathode comprises conjugated backbone polymers inserted with anions during charging.

* * * * *